(12) United States Patent
Ward

(10) Patent No.: US 7,953,908 B2
(45) Date of Patent: May 31, 2011

(54) HIGH THROUGHPUT PIPELINED DATA PATH

(75) Inventor: Robert E. Ward, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 16 days.

(21) Appl. No.: 11/754,294

(22) Filed: May 27, 2007

(65) Prior Publication Data

US 2008/0294799 A1 Nov. 27, 2008

(51) Int. Cl.
*G06F 3/00* (2006.01)
*G06F 5/00* (2006.01)
*G06F 13/00* (2006.01)
*G06F 13/12* (2006.01)
*G06F 13/38* (2006.01)
*G06F 15/16* (2006.01)

(52) U.S. Cl. ............... 710/59; 710/60; 710/32; 710/52; 710/62; 709/234

(58) Field of Classification Search .................... 710/62, 710/52, 59, 60, 32; 709/234
See application file for complete search history.

(56) References Cited

U.S. PATENT DOCUMENTS

| | | | | | |
|---|---|---|---|---|---|
| 4,739,321 | A | * | 4/1988 | Friedman et al. | 370/445 |
| 5,218,674 | A | * | 6/1993 | Peaslee et al. | 345/562 |
| 5,315,696 | A | * | 5/1994 | Case et al. | 345/522 |
| 5,689,644 | A | * | 11/1997 | Chou et al. | 370/392 |
| 5,909,559 | A | * | 6/1999 | So | 710/307 |
| 5,961,640 | A | * | 10/1999 | Chambers et al. | 712/300 |
| 5,974,467 | A | * | 10/1999 | Haddock et al. | 709/240 |
| 6,016,513 | A | * | 1/2000 | Lowe | 709/250 |
| 6,694,392 | B1 | * | 2/2004 | Haren | 710/65 |
| 6,804,257 | B1 | * | 10/2004 | Benayoun et al. | 370/471 |
| 7,362,771 | B1 | * | 4/2008 | Lo et al. | 370/429 |
| 2003/0002503 | A1 | * | 1/2003 | Brewer et al. | 370/392 |

FOREIGN PATENT DOCUMENTS

EP 1152573 A2 * 11/2001

* cited by examiner

*Primary Examiner* — Chun-Kuan Lee
*Assistant Examiner* — Farley Abad

(57) ABSTRACT

Methods and apparatus to provide a high throughput pipelined data path are described. In one embodiment, an apparatus may include three stages to process inbound data packets, e.g., to align one or more bits of data. Other embodiments are also described.

18 Claims, 3 Drawing Sheets

HIGH THROUGHPUT PIPELINED DATA PATH

FIELD

The present description generally relates to electronic devices. More particularly, an embodiment of the invention generally relates to a high throughput pipelined data path.

BACKGROUND

Peripheral Component Interface (PCI) express (PCIe) devices promise to provide more data throughput when compared with previously available PCI or PCI extended (PCI-X) devices. Some PCIe implementations may utilize credits to balance the sharing of available bandwidth on a PCIe bus amongst various devices.

However, when implementing PCIe with infinite completion credits, transactions may have to be processed at the same rate as they are received. More specifically, transactions containing the largest possible payload may require 1025 clock cycles, whereas the smallest transactions may be received in a single clock cycle. The two differing types of transactions may arrive back to back. To make matters more complicated, the link may flag a transaction as bad at the end, e.g., after having written all the data to the backend of a PCIe device and the logic would have to rewind the address and wait for a replay of the transaction. Accordingly, such implementations may be inefficient and suffer from latency.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some of the embodiments discussed herein (such as the embodiments discussed with reference to FIGS. 1-3) may improve data throughput in data paths (such as those complying with the PCIe standard) by utilizing a pipelined state machine. Furthermore, as will be discussed herein, e.g., with reference to FIGS. 2-3, the pipeline may include three stages in an embodiment. Furthermore, some of the embodiments discussed herein may be utilized in storage systems, such as the system discussed with reference to FIG. 1.

Figure 1:
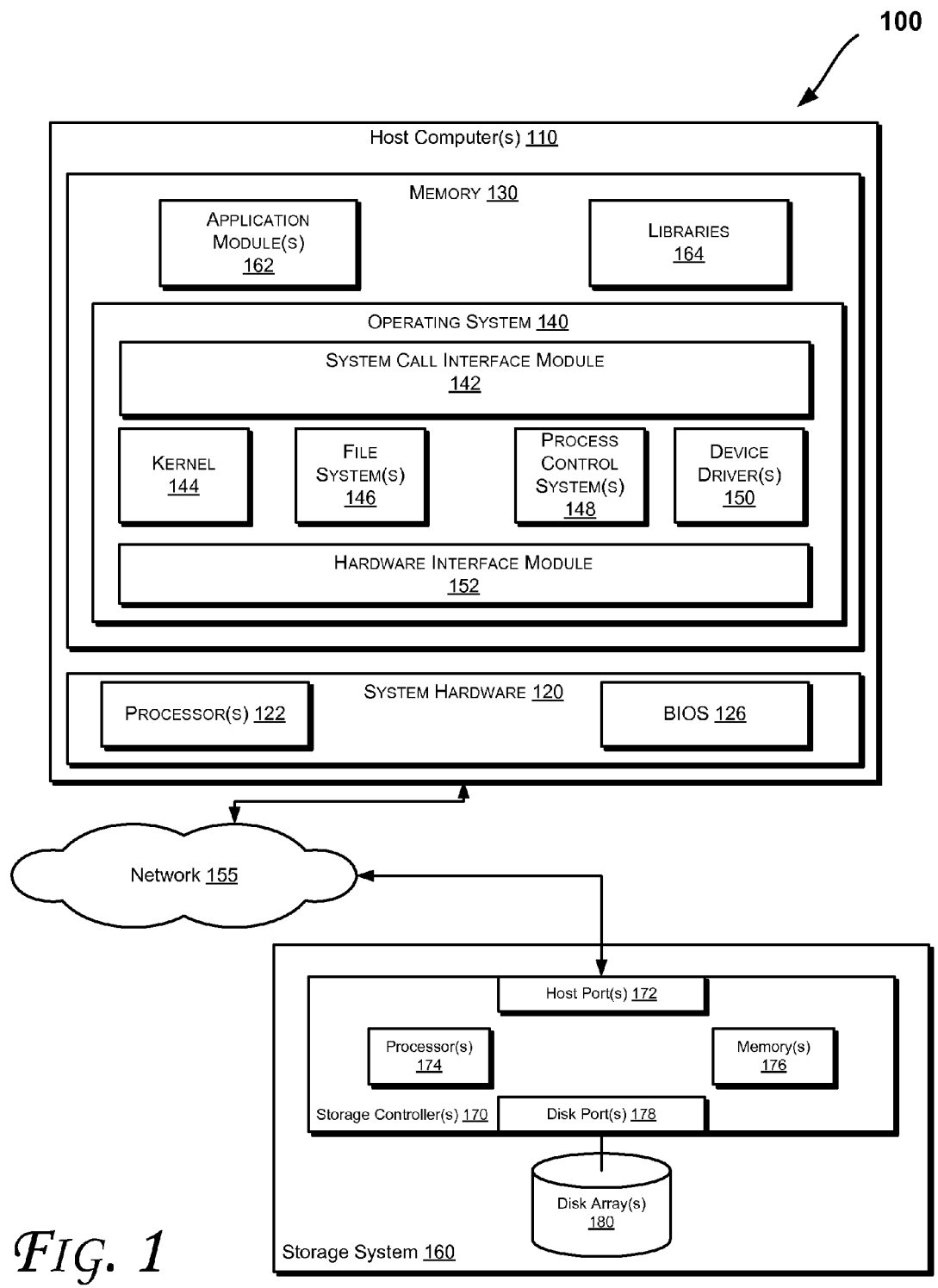
FIG. 1 is a schematic illustration of components of a storage system in accordance with some embodiments.

More particularly, FIG. 1 is a schematic illustration of components of a storage system 100 in accordance with some embodiments. The storage system 100 may include one or more host computers 110 coupled to one or more storage systems 160 via a communication network 155.

Host computer(s) 110 may include system hardware 120 commonly implemented on a motherboard and at least one auxiliary circuit board. System hardware 120 includes, among other things, one or more processors 122 and a basic input/output system (BIOS) 126. BIOS 126 may be implemented in flash memory and may comprise logic operations to boot the computer device and a power-on self-test (POST) module for performing system initialization and tests. In operation, when activation of computing system 100 begins, processor 122 accesses BIOS 126 and shadows the instructions of BIOS 126, such as power-on self-test module, into operating memory. Processor 122 then executes power-on self-test operations to implement POST processing.

Computer system 110 further includes memory 130, which may be implemented as random access memory (RAM), dynamic random access memory (DRAM), read-only memory (ROM), magnetic memory, optical memory, or combinations thereof. Memory 130 includes an operating system 140 for managing operations of computer 110. In one embodiment, operating system 140 includes a hardware interface module 154 that provides an interface to system hardware 120. In addition, operating system 140 includes a kernel 144, one or more file systems 146 that manage files used in the operation of computer 110 and a process control subsystem 148 that manages processes executing on computer 110.

Operating system 140 further includes one or more device drivers 150 and a system call interface module 142 that provides an interface between the operating system 140 and one or more application modules 162 and/or libraries 164. The various device drivers 150 interface with and generally control the hardware installed in the computing system 100.

In operation, one or more application modules 162 and/or libraries 164 executing on computer 108 make calls to the system call interface module 142 to execute one or more commands on the computer's processor. The system call interface module 142 invokes the services of the file systems 146 to manage the files required by the command(s) and the process control subsystem 148 to manage the process required by the command(s). The file system(s) 146 and the process control subsystem 148, in turn, invoke the services of the hardware interface module 154 to interface with the system hardware 120. The operating system kernel 144 may be generally considered as one or more software modules that are responsible for performing many operating system functions.

The particular embodiment of operating system 140 is not critical to the subject matter described herein. Operating system 140 may be embodied as a UNIX operating system or any derivative thereof (e.g., Linux, Solaris®, etc.) or as a Windows® brand operating system. Computer system 110 may include one or more accompanying input/output devices such as, e.g., a display, a keyboard, and a mouse, and the like.

In an embodiment, storage system 160 generally comprises one or more storage controllers 170 coupled to one or more disk arrays 180, or other storage media. Storage controller 170 manages input/output (I/O) requests from host computer(s) 110 for storing and retrieving information on one or more disk arrays 180. Storage controller 170 may include one or more host ports 172 that couple to network 155 to provide a communication interface with host computer(s)

110. Host ports 172 may include appropriate logic for interfacing with attached host computer(s) 110 via appropriate protocols and media associated with communication network 155. In some embodiments, communication network 155 may utilize peripheral component interconnect (PCI), PCI-X, PCI express (PCIe), other parallel bus structures, and high speed serial interface communication paths or the like to facilitate communication between the storage system 160 and the host computer 110.

Storage system controller 170 may also include one or more disk port(s) 178 which provide an interface for interacting with attached disk arrays 180. Disk ports 178 may operate according to Fibre Channel, parallel small computer system interface (SCSI), other parallel bus structures, and other high speed serial communication media and protocols (such as Serial Advanced Technology Attachment (SATA) and/or Serial-Attached SCSI (SAS)). Disk ports 178 therefore represent any of several commercially available interface elements for exchanging information with attached disk arrays 180.

Storage controller 170 may include one or more processors 174 to control operations of storage controller 170. For example, the processor(s) 174 may fetch and execute programmed instructions as well as associated variables from program memory 176. Memory 110 may be any suitable memory device for storing programmed instructions and/or associated data to be executed or manipulated by processor 174 including, for example, ROM, PROM, EPROM, flash memory, RAM, DRAM, SDRAM, etc.

In some embodiments, memory 176 may include cache memory, which may be utilized as a buffer for storing data supplied by a host computer 110 in an I/O write request. Data to be read from, and written to, disk arrays 180 may be staged in cache memory or buffer. A direct memory access (DMA) controller may effectuate transfers between elements of the controller 170.

Those of ordinary skill in the art will recognize a wide variety of equivalent structures to that of storage system 100 of FIG. 1 to provide features and aspects hereof. In particular, numerous additional functional elements may be recognized by those of ordinary skill in the art as desirable for implementing a fully featured storage system controller 170. Still further, additional integration of components will be readily apparent where, for example, DMA controller and processor may be integrated within a single microcontroller component. In addition, those of ordinary skill in the art will recognize that processor 174 may be any of a variety of general purpose or special purpose processors adapted for overall control of storage controller 170.

Figure 2:
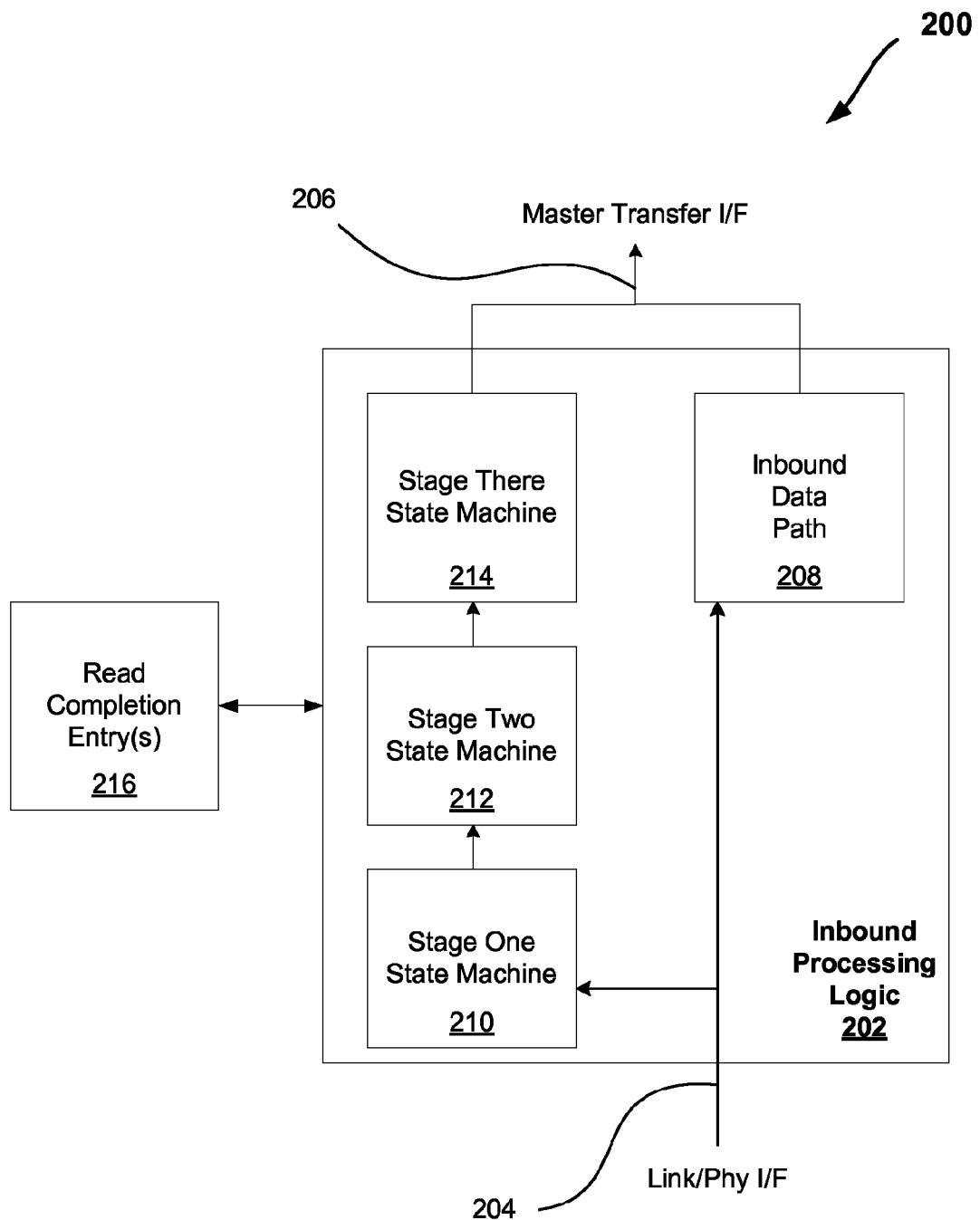
FIG. 2 illustrates a block diagram of a pipelined data path, according to one embodiment of the invention.

FIG. 2 a block diagram of a pipelined data path 200, according to one embodiment of the invention. In one embodiment, the path 200 may be implemented to process data transferred in accordance with the PCIe standard. The components discussed with reference to FIG. 2 may be implemented on various devices, such as a single integrated circuit die, a NIC, etc. Also, the components discussed with reference to FIG. 2 may be implemented as hardware, software, or combinations thereof in some embodiments.

As shown in FIG. 2, an inbound processing logic 202 may receive inbound data corresponding to a transaction (which will be divided into a packet with data and header information in an embodiment) over a link/physical interface 204 (e.g., from the network 155 of FIG. 1) which it may pass to a master transfer interface 206 (such as the host computer 110 of FIG. 1). Moreover, the received data may be passed to an inbound data path storage 208 and a first stage 210. In one embodiment, the inbound data path storage 208 may store the received data, e.g., to allow the various stages of the logic 202 to align the received data, for example, based on the source (e.g., where first byte came from) and destination (e.g., where first byte goes). In one embodiment, the first three 32-bit words of the received data are the headers that may indicate all information about the transfer and the rest is data. In an embodiment, stage one 210 may monitor the inbound transactions to determine the occurrence of a completion (e.g., end of packet (EOP)). The transfer may be loaded into stage one 210 of the pipelined state machine on start of packet (SOP) if the received packet corresponds to a valid entry which was loaded when the data transfer was requested. For example, the received data may be checked against an entry table (not shown) that is filled in when an inbound command corresponds to a request, e.g., initiated by a command processor. The entry may indicate a tag number, byte count, source address, and destination address of the packet. In one embodiment, the entry may be stored in a split completion receiver (SCR) storage unit (not shown). In an embodiment, an elasticity buffer (not shown) coupled between the physical transaction layer (e.g., interface 204) and the pipelined state machine (e.g., stage one 210) may be provided in the logic 202 to selectively allow for a stall of the input pipe for one or more clock cycles, e.g., when it will take two backend transfers to complete the single front end transfer because of address offsets. In an embodiment, there may be no restrictions on the alignment of addresses between front (e.g., PCIe) and back (e.g., internal application specific IC (ASIC)) buses. This stage may clear on the next clock cycle if there is not a transfer on the bus.

The transfer may then be loaded into stage two 212 of the pipelined state machine. Byte counts, shift counts based on source and destination address (e.g., where the shift count may indicate whether bits are to be aligned), first and last (if applicable to transfer size) byte enables may be calculated in this stage for the received packet. Updated address and updated byte counts may also be calculated in this stage which may then be used to update the corresponding entry (e.g., in storage 216) or clear it. At this same time the next transfer (if present) may be loaded into stage one 210. In some embodiments, transfers may be broken up at certain address boundaries (e.g., Read Completion Boundaries aka RCBs). If this new completion being loaded into the pipeline is part of the current transfer already in the pipeline, the calculated updated address and byte count information from the current transfer is used to align the data from the new transfer. If the current transfer is flagged as bad, then the entry may be rewound to where it started at this transfer and the next subsequent transfers will also be flagged bad until the retransmission of the first is received. In some implementations, PCIe provides for sequence number and sequence rules that do not allow transfers with the same tag (broken up) out of order.

After stage two, the transfer is then loaded into stage three 214 and subsequently written to the back end. If the back end takes two backend transfers to complete the single front end transfer because of address offsets, the elasticity buffer may be used to buffer one or more clock cycles and stall the next transfer received into stage one 210. In an embodiment, the stage three 214 runs as long or as short as it takes for the 128 bit wide transfers to complete the transaction. At the end of the transfer the entry is either updated with new address and byte count (e.g., a partial byte count) or cleared if the transfer is complete.

As shown in FIG. 2, the inbound processing logic 202 may communicate with a storage 216 that stores data corresponding to one or more read completion entries. For example, the remaining byte count and/or the destination address may be updated based on how much of the data was provided at this transaction, which could be all or part of the data. In one instance, the source address will be 0000 after the first transfer (if it was just partial data) because the break point allowable discount boundary (ADB) occurs at that point. In an embodiment, the data path 200 may be 128 bits wide and PCIe read completions (stored in storage 216) may be broken into 32-bit words called dwords. The first three dwords may be headers that indicate completion information and the rest of the dwords may be the data, or there may also be completions without data that requires no back end write, just the clearing of the corresponding SCR Entry. An entire PCIe packet consisting of three dwords of header and one dword of data will form a complete single clock transfer. This may be followed by another complete single clock transfer and another, and so on. The transfer may also start and end in any one of four different dword positions. More specifically, each transfer will have a designed start of packet (SOP) indication, a valid flag, and end of packet (EOP) indication.

Figure 3:
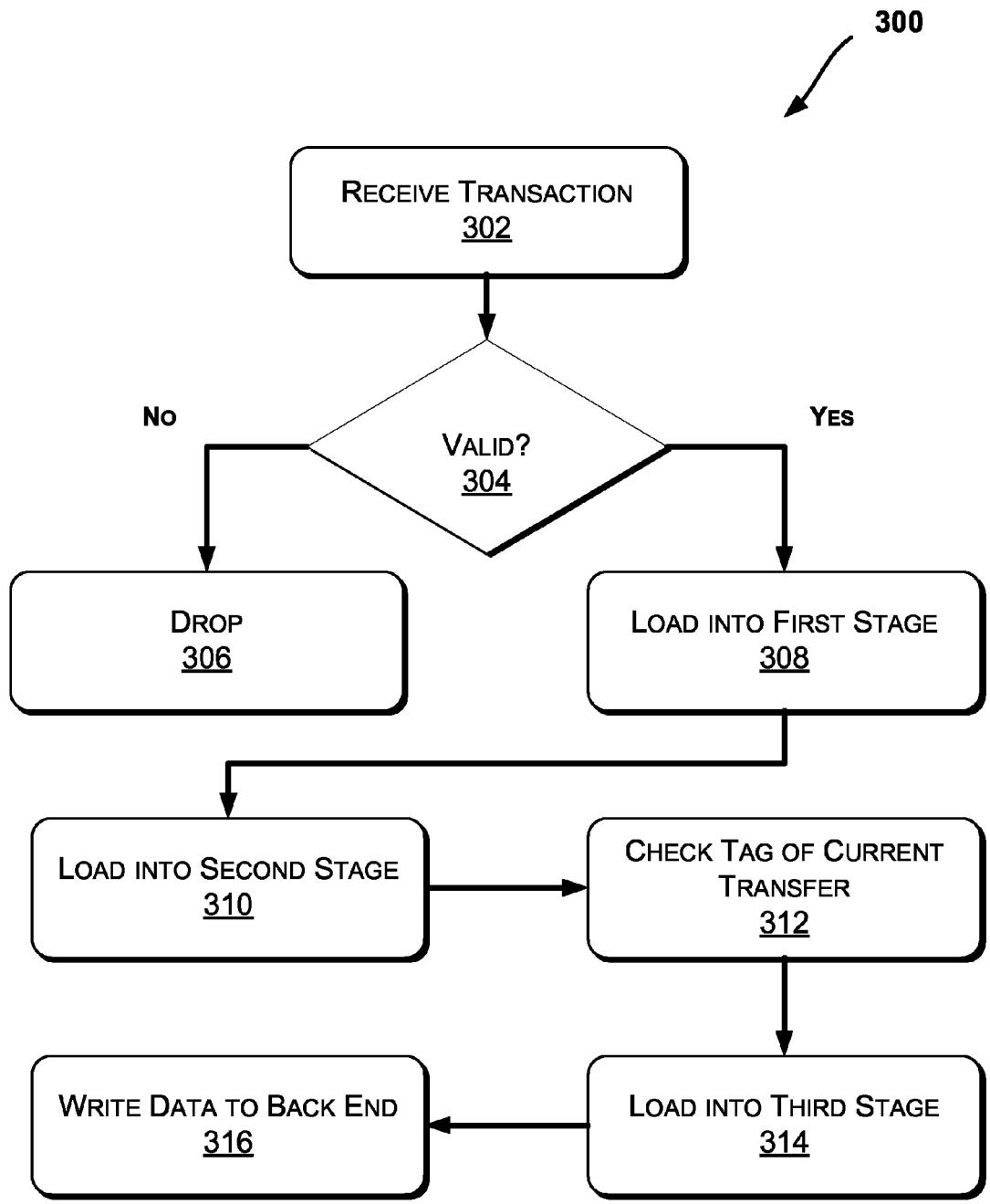
FIG. 3 illustrates a flow diagram of a method according to an embodiment.

FIG. 3 illustrates a flow diagram of an embodiment of a method 300 to process inbound data in a pipelined data path. In an embodiment, various components discussed with reference to FIGS. 1-2 may be utilized to perform one or more of the operations discussed with reference to FIG. 3.

Referring to FIGS. 1-3, at an operation 302, an inbound transaction (e.g., in form of a packet) may be received (e.g., as discussed with reference to FIG. 2). At an operation 304, various fields in the headers of a packet (e.g., three headers of a PCI packet) are checked (e.g., on the fly by stage one 210 referring to the SCR storage) to determine if the received packet is a valid expected completion packet with a valid destination. If the received packet is invalid, the packet is dropped at an operation 306 (e.g., an Unexpected Completion Error signal is asserted). Otherwise, if operation 304 determines that the received packet is valid, the data is loaded into the first stage of the pipelined state machine (e.g., stage 210). The transfer may be one clock wide with SOP and EOP on or up to the maximum data size that is set in the configuration registers. At an operation 310, a valid completion is loaded into stage two of the pipelined state machine (e.g., stage 212).

At an operation 312 (e.g., on the fly), the tag of this current transfer is checked to determine if it is part of a previous transfer that may or may not be being completed in the third stage ahead of it. For example, stage two 212 may calculate the destination address and first and last byte enable information based on the tags entry or updated entry information if it was part of a transfer currently being written. It may further calculate the number of transfers to expect for the data size that was advertised in the header information to prevent data over run and to flag data under run. At an operation 314, the completion is loaded into stage three of the pipelined state machine (e.g., stage 214) and data may be written to the back end via the transfer inbound bus (e.g., interface 206) at an operation 316. As discussed with reference to FIG. 2, the third stage may run as many transfers as it takes to write all the data. Moreover, the EOP signal may flag the end and also indicate if the transfer status was good or if the transfer is to be disregarded. In one embodiment, valid transfers that have an EOP with bad status may be rewound. Address and byte count information may be updated at this time (e.g., at operation 316). Also, the tag may be cleared if the data has all been transferred. A new SOP may start another transfer on the same clock cycle as this EOP ended this transfer. This new tag may or may not be the same as the current one.

In various embodiments of the invention, the operations discussed herein, e.g., with reference to FIGS. 1-3, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed with respect to FIGS. 1-3.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
    a first stage to receive a plurality of data packets, comprising a data packet, through a physical interface, wherein the first stage is to load data corresponding to the received packet in response to a determination that the received packet is a valid expected completion packet with a valid destination;
    a second stage to determine whether one or more bits within the data packet are to be shifted and align the bits;
    a third stage coupled to a transfer interface to transfer the aligned bits; and
    a storage device to store a plurality of entries to indicate read completion status corresponding to the plurality of data packets, wherein a buffer stores data corresponding to the data packet to stall a next transfer received at the first stage for one or more clock cycles in response to a determination that it will take two backend transfers to complete a single frontend transfer of the data packet.

2. The apparatus of claim 1, wherein the second stage computes a byte count, shift count, first byte enable, and last byte enable.

3. The apparatus of claim 1, wherein the second stage computes the shift count based on a group consisting essentially of source and destination addresses of the data packet.

4. The apparatus of claim 1, wherein a network interface card comprises the first, second, and third stages.

5. The apparatus of claim 1, wherein the physical interface is coupled to a network.

6. The apparatus of claim 1, wherein the transfer interface is coupled to a host computer.

7. The apparatus of claim 1, wherein the read completion status is to indicate whether a corresponding data packet from the plurality of data packets has been completely received at the first stage.

8. A method comprising:
   receiving at a first stage a plurality of data packets, comprising a data packet, wherein the first stage is to load data corresponding to the received packet in response to a determination that the received packet is a valid expected completion packet with a valid destination;
   determining at a second stage whether one or more bits within the data packet are to be shifted and align the bits;
   transferring at a third stage the aligned bits; and
   storing a plurality of entries to indicate read completion status corresponding to the plurality of data packets, wherein a buffer stores data corresponding to the data packet to stall a next transfer received at the first stage for one or more clock cycles in response to a determination that it will take two backend transfers to complete a single frontend transfer of the data packet.

9. The method of claim 8, further comprising receiving the data packet through a physical interface.

10. The method of claim 8, further comprising coupling the third stage to a transfer interface to transfer the aligned bits.

11. The method of claim 10, further comprising coupling the transfer interface to a host computer.

12. The method of claim 8, further comprising the second stage computing a byte count, shift count, first byte enable, and last byte enable of the received data packet.

13. The method of claim 8, further comprising the second stage computing the shift count based on a group consisting essentially of source and destination addresses of the data packet.

14. The method of claim 8, wherein the read completion status is to indicate whether a corresponding data packet from the plurality of data packets has been completely received at the first stage.

15. A computer-readable storage medium storing one or more instructions that when executed on a processor configure the processor to:
   receive at a first stage a plurality of data packets, comprising a data packet, wherein the first stage is to load data corresponding to the received packet in response to a determination that the received packet is a valid expected completion packet with a valid destination;
   determine at a second stage whether one or more bits within the data packet are to be shifted and align the bits;
   transfer at a third stage the aligned bits; and
   store a plurality of entries to indicate read completion status corresponding to the plurality of data packets, wherein a buffer stores data corresponding to the data packet to stall a next transfer received at the first stage for one or more clock cycles in response to a determination that it will take two backend transfers to complete a single frontend transfer of the data packet.

16. The computer-readable storage medium of claim 15, further comprising one or more instructions that configure the processor to receive the data packet through a physical interface.

17. The computer-readable storage medium of claim 15, further comprising one or more instructions that configure the processor to cause the second stage to compute a byte count, shift count, first byte enable, and last byte enable of the received data packet.

18. The computer-readable storage medium of claim 15, wherein the read completion status is to indicate whether a corresponding data packet from the plurality of data packets has been completely received at the first stage.

* * * * *